(12) United States Patent
Tsou et al.

(10) Patent No.: US 10,069,192 B2
(45) Date of Patent: Sep. 4, 2018

(54) PORTABLE COMMUNICATION DEVICE

(71) Applicant: HTC CORPORATION, Taoyuan (TW)

(72) Inventors: Tun-Yuan Tsou, Taoyuan (TW);
Pei-Ling Teng, Taoyuan (TW);
Yi-Chun Chen, Taoyuan (TW);
Hong-Lung Chen, Taoyuan (TW);
Kuo-Cheng Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 412 days.

(21) Appl. No.: 14/823,112

(22) Filed: Aug. 11, 2015

(65) Prior Publication Data
US 2015/0349408 A1 Dec. 3, 2015

Related U.S. Application Data

(63) Continuation of application No. 13/304,726, filed on Nov. 28, 2011, now Pat. No. 9,160,058.

(51) Int. Cl.
*H01Q 9/42* (2006.01)
*H01Q 1/24* (2006.01)
(Continued)

(52) U.S. Cl.
CPC ........... *H01Q 1/243* (2013.01); *H01Q 1/2266* (2013.01); *H01Q 1/48* (2013.01); *H01Q 1/52* (2013.01);
(Continued)

(58) Field of Classification Search
CPC .................................................... H01C 23/00
(Continued)

(56) References Cited

U.S. PATENT DOCUMENTS 6,255,994 B1 7/2001 Saito
2002/0094789 A1 7/2002 Harano
(Continued)

FOREIGN PATENT DOCUMENTS

| CN | 1254205 A | 5/2000 |
|---|---|---|
| EP | 1870960 A2 | 12/2007 |
| TW | M349049 | 1/2009 |

OTHER PUBLICATIONS

Rodney Vaughan, "Switched Parasitic Elements for Antenna Diversity" IEEE Transactions on Antennas and Propagation, vol. 47, No. 2, Feb. 1999.
(Continued)

*Primary Examiner* — Andrea Lindgren Baltzell
(74) *Attorney, Agent, or Firm* — McClure, Qualey & Rodack, LLP

(57) ABSTRACT

A portable communication device includes an appearance, a substrate and a switchable resonant antenna. The substrate is disposed in the appearance, and the substrate has a ground plane. The switchable resonant antenna comprises a first connection portion, a switching unit, a first metal element and a second metal element, where the first connection portion is electrically coupled between the ground plane and the switching unit, the switching unit is configured to electrically couple the first connection portion to the first metal element or the second metal element according to a control signal generated corresponding to a detecting result, in order to generate a first resonant mode.

20 Claims, 6 Drawing Sheets

(51) Int. Cl.
  H04M 1/02    (2006.01)
  H01Q 1/48    (2006.01)
  H01Q 1/22    (2006.01)
  H01Q 1/52    (2006.01)
  H01Q 3/24    (2006.01)
  H01Q 9/04    (2006.01)
  H01Q 9/14    (2006.01)
(52) U.S. Cl.
  CPC ............. H01Q 3/24 (2013.01); H01Q 9/0421 (2013.01); H01Q 9/145 (2013.01); H01Q 9/42 (2013.01); H04M 1/026 (2013.01)
(58) Field of Classification Search
  USPC .......................................................... 343/702
  See application file for complete search history.

(56) References Cited

U.S. PATENT DOCUMENTS

| | | |
|---|---|---|
| 2004/0051665 A1 | 3/2004 | Chen |
| 2005/0287959 A1 | 12/2005 | Park et al. |
| 2006/0084395 A1* | 4/2006 | Kezys .................... H01Q 1/243 455/101 |
| 2008/0085736 A1 | 4/2008 | Kitamura et al. |
| 2008/0316115 A1 | 12/2008 | Hill et al. |
| 2010/0194653 A1* | 8/2010 | Chiang ................ H01Q 1/2266 343/749 |
| 2010/0220016 A1* | 9/2010 | Nissinen ................ H01Q 1/243 343/702 |
| 2012/0071203 A1 | 3/2012 | Wong |
| 2013/0169507 A1 | 7/2013 | Ko et al. |

OTHER PUBLICATIONS

English translation of abstract of TW M349049 (published Jan. 11, 2009).

English translation of abstract of CN 1254205 A (published May 24, 2000).

Taiwan Office Action dated Feb. 16, 2015.

* cited by examiner

PORTABLE COMMUNICATION DEVICE

RELATED APPLICATIONS

The present application is a continuation application of U.S. application Ser. No. 13/304,726 filed on Nov. 28, 2011, now U.S. Pat. No. 9,160,058, the disclosure of which is hereby incorporated by reference herein in its entirely.

BACKGROUND

Field of Invention

The subject application relates to a communication device. More particularly, the subject application relates to a portable communication device.

Description of Related Art

With the rapid progress of wireless communication technology, portable communication devices, such as mobile phones, personal digital assistants (PDAs) and tablets, have become very popular and are considered indispensable for many people.

Antennas configured to radiate and receive electromagnetic waves so as to transmit and exchange wireless information signals are undoubtedly one of the most important components of portable communication devices. Recently, because communication systems and applications therefor have experienced continued rapid growth, the antenna must be designed to work with multiple frequency bands, so as to encompass a plurality of operating frequency bands used by such systems. Furthermore, because portable communication devices are becoming increasingly thinner, lighter and miniaturized, physical limits are placed on the antennas used in portable communication devices. As a result, the design of such multi-band antennas is made ever more difficult.

With conventional techniques, a bezel of the portable communication device is cut into a plurality of metal segments, and through implementation of various structural designs, these segments serve as portions of the antenna of the portable communication device. However, the parasitic capacitance effect on the cut-out portions of the bezel cause resonant frequency shift and an increase in the return loss of an antenna resonant mode when a user's hand is close to or touches these cut-out portions of the bezel. This may cause communication interruption or poor reception in the portable communication device.

In the view of foregoing, there is an urgent need in the related field to provide a solution.

SUMMARY

In one or more various aspects, the subject application is directed to a portable communication device. The portable communication device includes an appearance, a substrate and a switchable resonant antenna. The substrate is disposed in the appearance, and the substrate has a ground plane. The switchable resonant antenna comprises a first connection portion, a switching unit, a first metal element and a second metal element, where the first connection portion is electrically coupled between the ground plane and the switching unit, the switching unit is configured to electrically couple the first connection portion to the first metal element or the second metal element according to a control signal generated corresponding to a detected result, in order to generate a first resonant mode.

In accordance with an embodiment of the present disclosure, the first metal element and the second metal element are portions of the appearance.

In accordance with an embodiment of the present disclosure, a first resonant cavity is formed between the first metal element and the ground plane when the first connection portion is electronically coupled to the first metal element, and a second resonant cavity is formed between the second metal element and the ground plane when the first connection portion is electronically coupled to the second metal element.

In accordance with an embodiment of the present disclosure, the appearance can include a bezel. A first gap is formed between one end of the bezel and the first metal element, and a second gap is formed between another end of the bezel and the second metal element.

In accordance with an embodiment of the present disclosure, the bezel comprises metal or non-metal.

In accordance with an embodiment of the present disclosure, the first gap and an electronic length of the first metal element are adjustable for controlling the first resonant mode generated by the first resonant cavity, and the second gap and an electronic length of the second metal element are adjustable for controlling the first resonant mode generated by the second resonant cavity.

In accordance with an embodiment of the present disclosure, an effective electronic length of the first metal element is equal to an effective electronic length of the second metal element.

In accordance with an embodiment of the present disclosure, the foregoing portable communication device further includes a first sensing unit and a second sensing unit. The first sensing unit is disposed adjacent to the first gap for sensing whether an object is close to or touches the first metal element and accordingly generating a first sensing signal. The second sensing unit disposed adjacent to the second gap for sensing whether the object is close to or touches the second metal element and accordingly generating a second sensing signal.

In accordance with an embodiment of the present disclosure, the foregoing portable communication device further includes a control unit. The control unit is electronically coupled to the first sensing unit, the second sensing unit and the switching unit for generating the control signal based on the sensing signals to control a switching state of the switching unit.

In accordance with an embodiment of the present disclosure, the foregoing portable communication device further includes a planar inverted-F antenna (PIFA). The PIFA includes a feeding portion, a ground end, a second connection portion, a first radiating portion and a second radiating portion. The feeding portion and the ground end are electronically coupled to the substrate, the ground end is electronically coupled to the ground plane of the substrate, and the second connection portion is electronically coupled to the feeding portion, the ground end, the first radiating portion and the second radiating portion.

In accordance with an embodiment of the present disclosure, the appearance includes a housing. The first radiating portion is disposed on or inside the housing to generate a second resonant mode, and the second radiation portion is also disposed on or inside the housing to generate a third resonant mode.

In accordance with an embodiment of the present disclosure, the foregoing portable communication device further includes at least one of a monopole antenna, a loop antenna, a slot antenna and an inverted-F antenna to generate resonant modes of required operating frequency bands.

In summary, through implementing the foregoing portable communication device of this subject application, the parasitic capacitance effect on the resonant frequency and the return loss of the antenna resonant mode can be reduced when a user is close to or touches the portable communication device. Therefore, the communication quality of the portable communication device can be maintained at a high level.

BRIEF DESCRIPTION OF THE DRAWINGS

The subject application can be more fully understood by reading the following detailed description of the embodiment, with reference made to the accompanying drawings as follows.

DETAILED DESCRIPTION

Figure 1A:
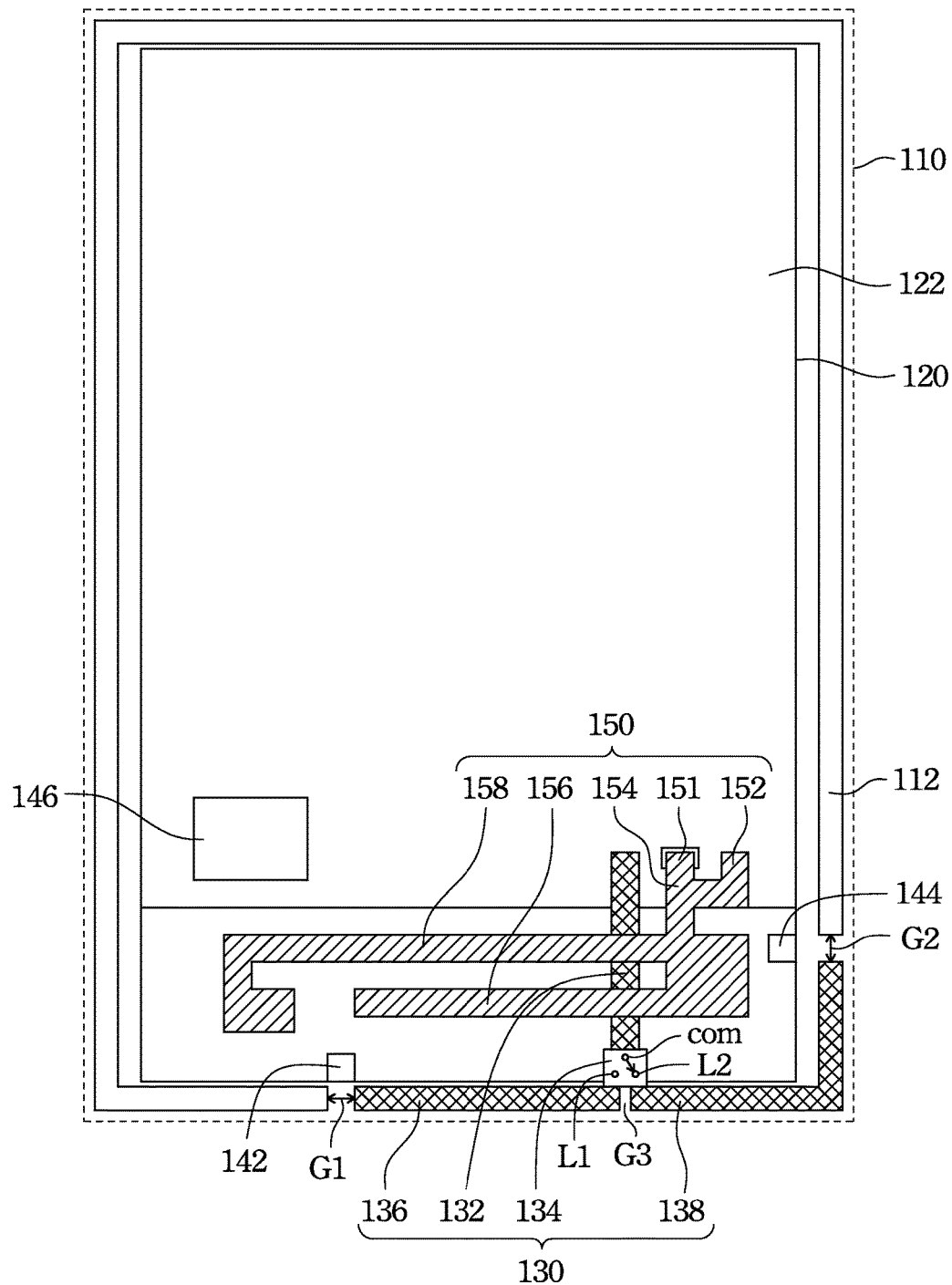
FIG. 1A is a schematic rear view of a portable communication device according to one embodiment of the present invention.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

FIG. 1A is a schematic rear view of a portable communication device 100 according to one embodiment of the present invention. This drawing is used to explain the deployment of the related components of the portable communication device 100 in a rear view, in which the rear view refers to the view opposite to a touch display module (not shown). The portable communication device 100 can include an appearance comprising housing 110, a substrate 120 and a switchable resonant antenna 130. The substrate 120 is disposed inside the housing 110 and has a ground plane 122. The switchable resonant antenna 130 can include a first connection portion 132, a switching unit 134, a first metal element 136 and a second metal element 138. The first connection portion 132 is electrically coupled between the ground plane 122 and the switching unit 134, and the switching unit 134 is configured to electrically couple the first connection portion 132 to the first metal element 136 or the second metal element 138 according to a control signal generated corresponding to a detected result, so as to generate a first resonant mode (or a first high frequency mode). As an example, the resonant frequency (or the operating frequency band) of the first resonant mode can be within the operating frequency band of UMTS-2100, namely 1920 MHz~2170 MHz.

In an embodiment of the present invention, the first metal element 136 and the second metal element 138 are arranged on the housing 110. The housing 110 is a structure for accommodating the related components of the portable communication device 100 and the housing 110 includes a frame or a bezel of the portable communication device 100. It is noted that the first metal element 136 and the second metal element 138 can be disposed outside or inside the housing 110, depending on the exterior design requirements of the portable communication device 100, and the present invention is not limited to the embodiment disclosed above.

In an embodiment of the present invention, the housing 110 can include a bezel 112. A first gap G1 is formed between one end of the bezel 112 and the first metal element 136, and a second gap G2 is formed between another end of the bezel 112 and the second metal element 138. It is noted that the bezel 112 can be formed of or comprise metal or non-metal, and both of the structure and the installation of the bezel 112 are determined based on the exterior design requirements of the portable communication device 100, and the present invention is not limited to the foregoing embodiment. In addition, each of the housing 110, bezel 112, the first metal element 136 and the second metal element 138 can be regarded as a portion of the appearance of the portable communication device 100.

In an embodiment of the present invention, a first resonant cavity is formed between the first metal element 136 and the ground plane 122 when the first connection portion 132 is electrically coupled to the first metal element 136. A second resonant cavity is formed between the second metal element 138 and the ground plane 122 when the first connection portion 132 is electrically coupled to the second metal element 138. It is noted that both the first resonant cavity and the second resonant cavity can be used to generate the first resonant mode, so as to radiate and receive related radio frequency (RF) signals and provide better return loss within the operating frequency band (or the resonant frequency) of the first resonant mode. As a result, the switchable resonant antenna 130 can have a better radiating performance in the first resonant mode.

In an embodiment of the present invention, the electrical length (i.e., the resonant path) of the first metal element 136 and the length of the first gap G1 are adjustable for controlling the first resonant mode generated by the first resonant cavity. For example, by adjusting the first gap G1 and the electrical length of the first metal element 136, the resonant frequency of the first resonant mode can be controlled within the operating frequency band of UMTS-2100, namely 1920 MHz~2170 MHz, and provide a better return loss in this frequency band, such as a return loss less than −10 dB. Similarly, the electrical length of the second metal element 138 and the length of the second gap G2 are adjustable for controlling the first resonant mode generated by the second resonant chamber. Besides, there is a third gap G3 formed between the first metal element 136 and the second metal element 138, and the third gap G3 is also adjustable for controlling at least one of the resonant frequency, bandwidth and return loss of the first resonant mode. In addition, the effective electronic length of the first metal element 136 is substantially equal to the effective electronic length of the second metal element 138.

Figure 1B:
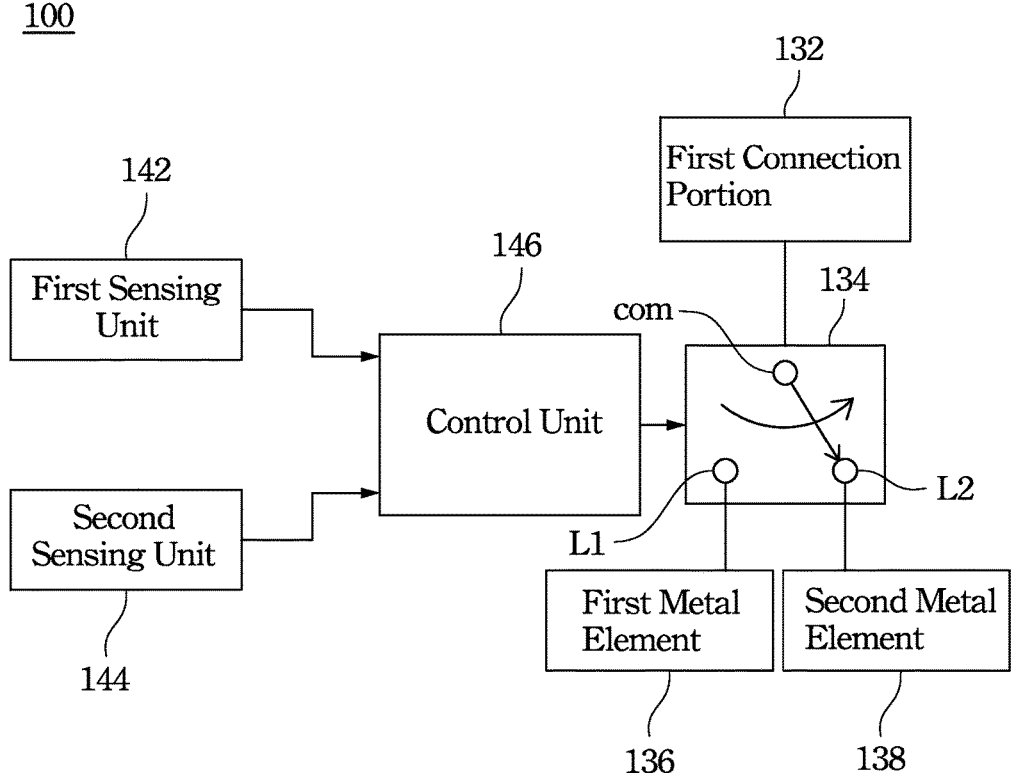
FIG. 1B is a block diagram of a portable communication device according to one embodiment of the present invention.

FIG. 1B is a block diagram of the portable communication device 100 according to one embodiment of the present invention. In an embodiment of the present invention, with reference to both FIG. 1A and FIG. 1B, the portable communication device 100 can further include a first sensing unit 142 and a second sensing unit 144. The first sensing unit 142 is disposed adjacent to the first gap G1 for sensing whether an object is close to or touches the first metal element 136 and accordingly outputs a first sensing signal. The second sensing unit 144 is disposed adjacent to the second gap G2 for sensing whether an object is close to or touches the second metal element 138 and accordingly outputs a second sensing signal. Generally, the first sensing unit 142 and the second sensing unit 144 can be sensors, such as optic sensors, proximity sensors, pressure sensors, touch sensors, etc.

In an embodiment of the present invention, the portable communication device 100 can further include a processor (not shown) and a control unit 146. The processor can receive the sensing signals of the first sensing unit 142 and the second sensing unit 144, and transmit the processed sensing signals to the control unit 146. In some embodiments, the processor is not included in the configuration of the portable communication device 100, in which case the control unit 146 is electronically coupled directly to the first sensing unit 142 and the second sensing unit 144, as well as to the switching unit 134. The control unit 146 generates signals based on the received sensing signals to control switching states of the switching unit 134.

For example, when an object, such as a user's hand, is close to or touches the second metal element 138, the second sensing unit 144, which may be a proximity sensor, senses the object and outputs the second sensing signal to the control unit 146. The control unit 146 generates a corresponding control signal based on the second sensing signal, and transmits the control signal to the switching unit 134. Accordingly, the switching unit 134 operates in a first switching mode, such that a common end (COM) of the switching unit 134 is connected to a first switching end L1. In this way, the first connection portion 132 can be electrically coupled to the first metal element 136, and the first resonant cavity is formed between the first metal element 136 and the ground plane 122. Similarly, when an object is close to or touches the first metal element 136, the first sensing unit 142 senses the object and outputs the first sensing signal to the control unit 146. The control unit 146 generates a corresponding control signal based on the first sensing signal and transmits the control signal to the switching unit 134. Accordingly, the switching unit 134 operates in a second switching mode, such that the common end (COM) of the switching unit 134 is connected to a second switching end L2. Hence, the first connection portion 132 can be electrically coupled to the second metal element 138, and the second resonant cavity is formed between the second metal element 138 and the ground plane 122. In other words, when the radiation efficiency of the first metal element 136 or of the second metal element 138 is reduced as a result of the user's hand touching or being close to the first metal element 136 or the second metal element 138, the control unit 146 generates a corresponding control signal based on the sensing result. Thus, the common end (COM) of the switching unit 134 is electrically coupled to the first switch end L1 or the second switching end L2, such that the quality of radiating and receiving electromagnetic waves of the antenna can be maintained at a high level.

In an embodiment of the present invention, the portable communication device 100 can further include a planar inverted-F antenna (PIFA) 150, in which the PIFA 150 is disposed on an antenna carrier (not shown) or the housing 110. The PIFA 150 can include a feeding portion 151, a ground end 152, a second connection portion 154, a first radiating portion 156 and a second radiating portion 158. The feeding portion 151 and the ground end 152 can be electrically coupled to the substrate 120 through springs or pogo pins. The ground end 152 can be electrically coupled to the ground plane 122 of the substrate 120. The springs and the pogo pins can be disposed on the substrate 120. In addition, the second connection portion 154 is electrically coupled to the feeding portion 151, the ground end 152, the first radiating portion 156 and the second radiating portion 158.

In an embodiment of the present invention, the appearance can include a housing 110, in which the first radiating portion 156 and the second radiating 158 can be disposed on or inside the housing. It is noted that the plane on which the PIFA 150 is disposed is different from the plane on which the substrate 120 disposed, and the electrical length (or the resonant path) of the first radiating portion 156 and the second radiating portion 158 are different to respectively generate a second resonant mode and a third resonant mode, so as to radiate and receive related RF signals. For example, when the electrical length of the first radiating portion 156 is shorter than the electrical length of the second radiating portion 158, the resonant frequency of the second resonant mode (or the second high frequency mode) generated by the first radiating portion 156 is higher than the resonant frequency of the third resonant mode (or the first low frequency mode) generated by the second radiating portion 158, in which the resonant frequency of the second resonant mode, also called as the second high frequency mode, can be within the operating frequency bands of DCS-1800 and PCS-1900, namely 1710 MHz~1990 MHz and 1850 MHz~1990 MHz, and the resonant frequency of the third resonant mode, also called as the first low frequency mode, can be within the operating frequency band of GSM-900, namely 824 MHz~960 MHz.

It is noted that the RF signals of the portable communication device 100 can be fed into the second connection 154 via the feeding portion 151 of the PIFA 150, and further fed into the first metal element 136 or the second metal element 138 by the coupling effect between the second connection portion 154 and the first connection portion 132, so as to generate the first resonant mode.

In an embodiment of the present invention, the portable communication device 100 can further include at least one of a monopole antenna, a ring antenna, a slot antenna and an inverted-F antenna for generating resonant modes of required operating frequency bands, so that the portable communication device 100 has a multi-band communication function. It is noted that the type and disposition of the antenna deployed on the portable communication device 100 are not limited to the foregoing embodiment.

Figure 2A:
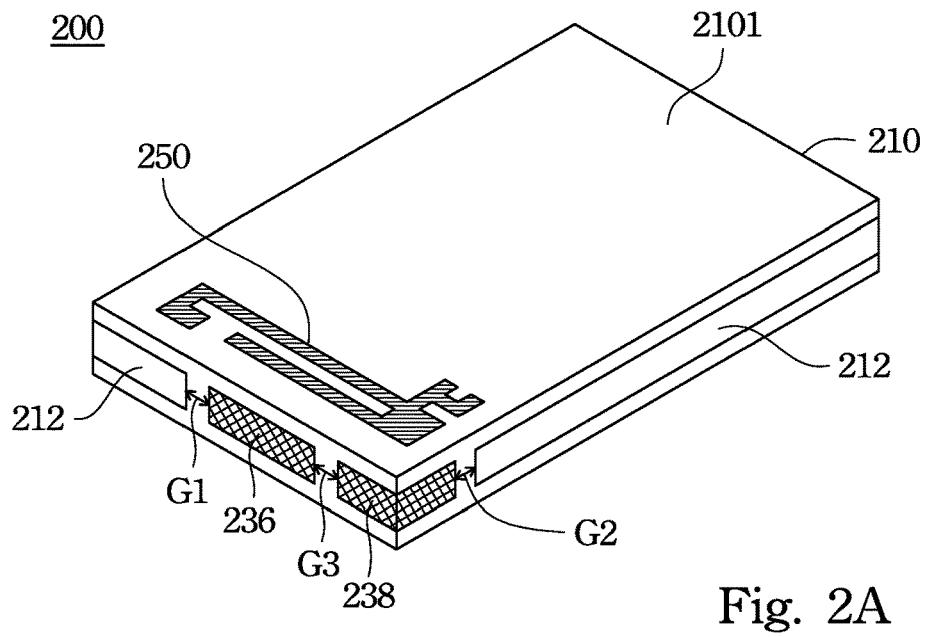
FIG. 2A is a perspective view of a portable communication device according to one embodiment of the present invention.

FIG. 2A is a perspective view of a portable communication device 200 according to one embodiment of the present invention. This figure illustrates the arrangement of related components of the portable communication device 200 in a rear view, where the rear view refers to a view opposite to a touch display module (not shown). The structure and the operations of the portable communication device 200 are the same as or similar to those of the portable communication device 100, so these aspects will not be repeated herein. In this embodiment, a PIFA 250 can be disposed on a first surface 2101 of a housing 210, for example, on the backside of the portable communication device 200. A bezel 212, a first metal element 236 and a second metal element 238 can be disposed on the sides of the housing 210.

Figure 3A:
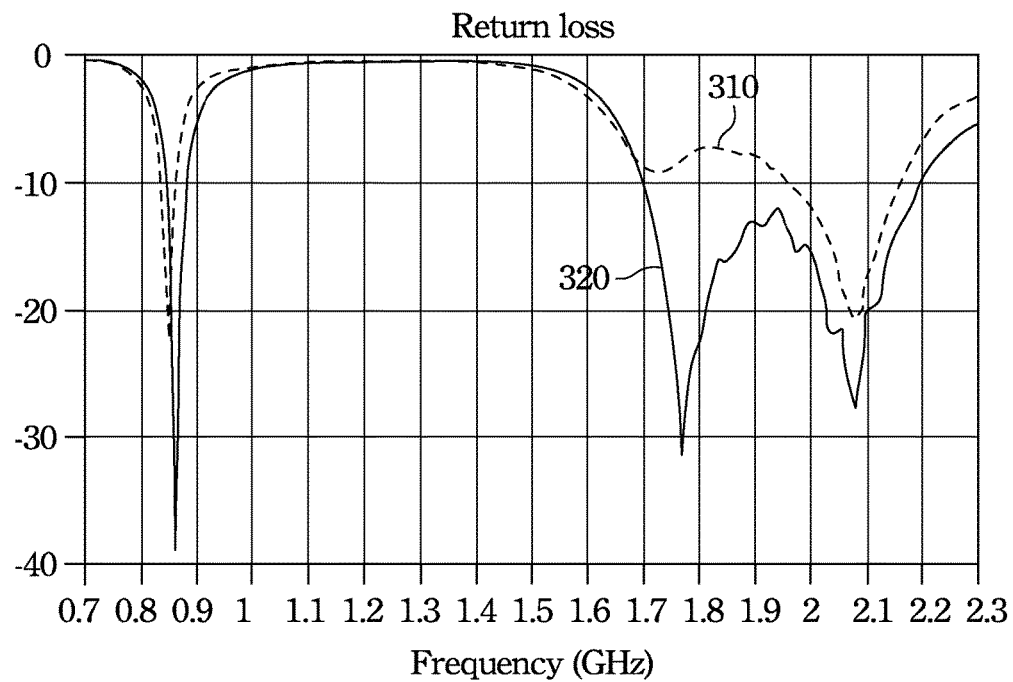
FIG. 3A is a graph illustrating antenna return loss of the portable communication device of FIG. 2A.

FIG. 3A is a graph illustrating antenna return loss of the portable communication device 200. A network analyzer can be connected to the feeding port of the PIFA 250 by a coaxial cable to measure return loss in different resonant modes, in which the resonant modes are generated by the first metal element 236 and the PIFA 250 or the second metal element 238 and the PIFA 250. The return loss within the resonant modes generated by the first metal element 236 and the second metal element 238 are respectively represented by a return loss curve 310 and a return loss curve 320 in FIG. 3A.

Figure 2B:
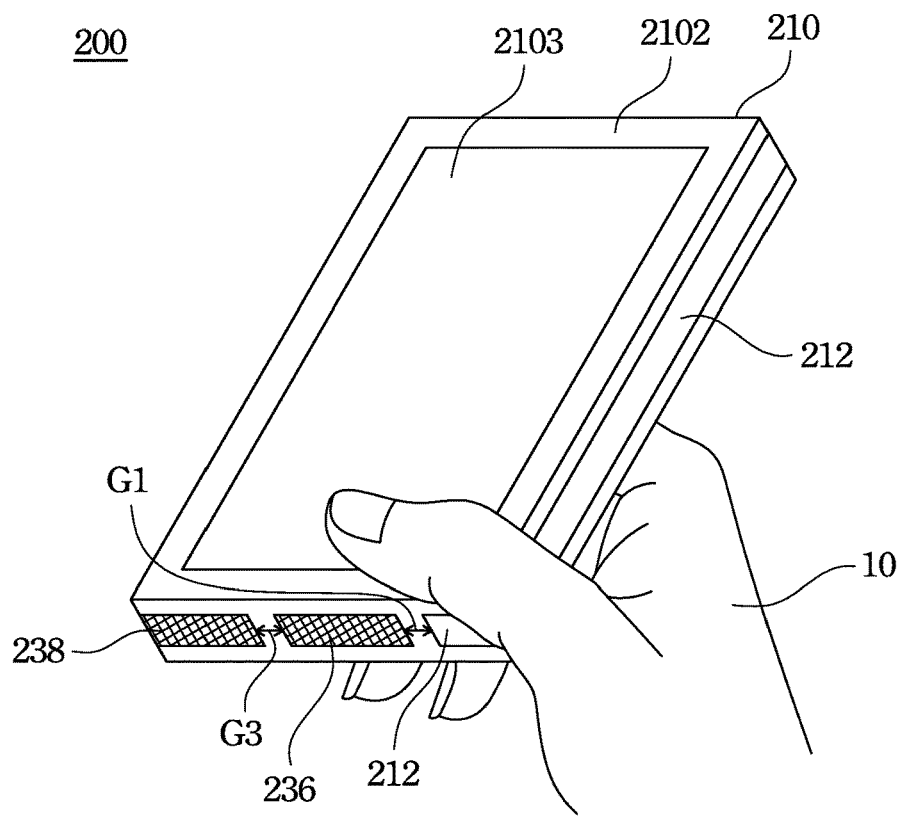
FIG. 2B shows the portable communication device of FIG. 2A in a condition held in a first use position.

FIG. 2B shows the portable communication device 200 of FIG. 2A in a condition held in a first use position. In an embodiment of the present invention, when the portable communication device 200 is held in the first use position, which may be used, for example, to view data displayed in the portable communication device 200 (a Data mode), a user's hand 10 may be close to or touch to a touch display module 2103 and the first metal element 236, in which the touch display module 2103 is disposed on a second surface 2102 of the housing 210 (e.g., a front side of the portable communication device 200), and the first metal element 236 is disposed on sides of the housing 210. When the user's hand 10 is close to or touches the first metal element 236, a plurality of resonant modes generated by the PIFA 250 and the first metal element 236 may be interfered with by a parasitic capacitance effect, thereby causing resonant frequency shifts and increasing return loss to, in turn, reduce the communication quality of the portable communication device 200.

Figure 3B:
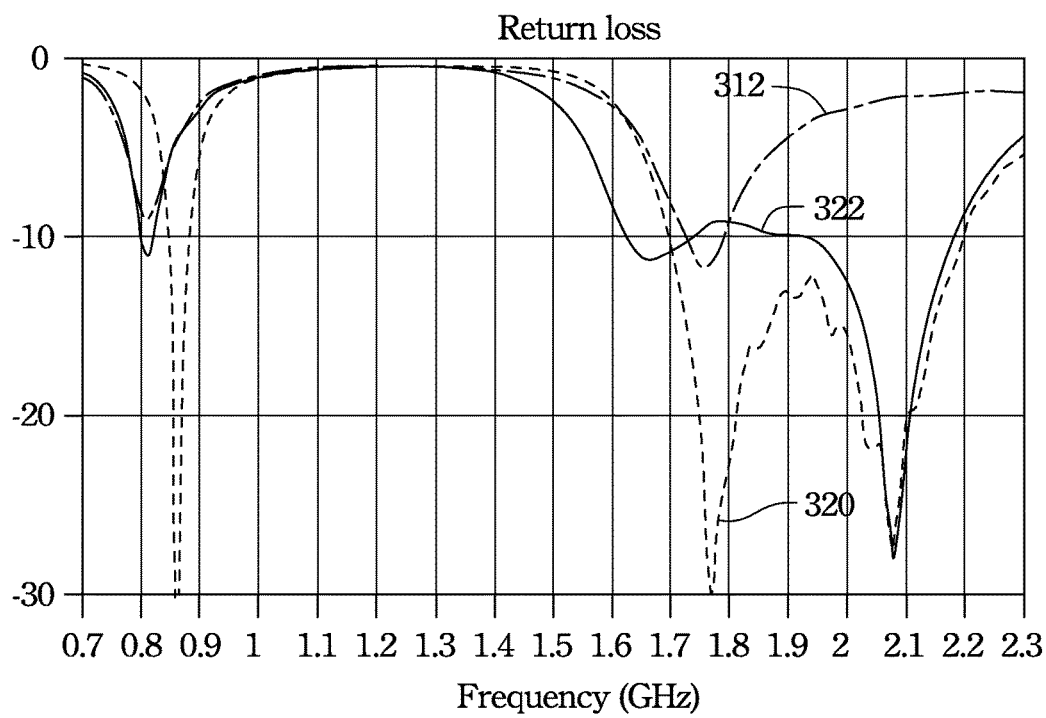
FIG. 3B is a graph illustrating antenna return loss of the portable communication device of FIG. 2A when held in the first use position as shown in FIG. 2B.

FIG. 3B is a graph illustrating antenna return loss of the portable communication device 200 when held in the first use position shown in FIG. 2B. In FIG. 3B, a return loss curve 312 is the return loss measurement result in the first operating mode of the PIFA 250 and the first metal element 236 of the portable communication device 200, and a return loss curve 322 is the return loss measurement result in the first operating mode of the PIFA 250 and the second metal element 238 of the portable communication device 200. When the user's hand 10 is close to or touches the first metal element 236, the portable communication device 200 can select the second metal element 238 by the switching unit 134 shown in FIG. 1 to form the resonant cavity, so that the resonant frequencies of the first to the third resonant mode generated by the PIFA 250 and the second metal element 238 are within the operating frequency bands of DCS-1800 and/or PCS-1900, UMTS-2100 and GSM-900, and the portable communication device 200 also has better return loss within the foregoing operating frequency bands, as shown by a return loss curve 322.

Figure 2C:
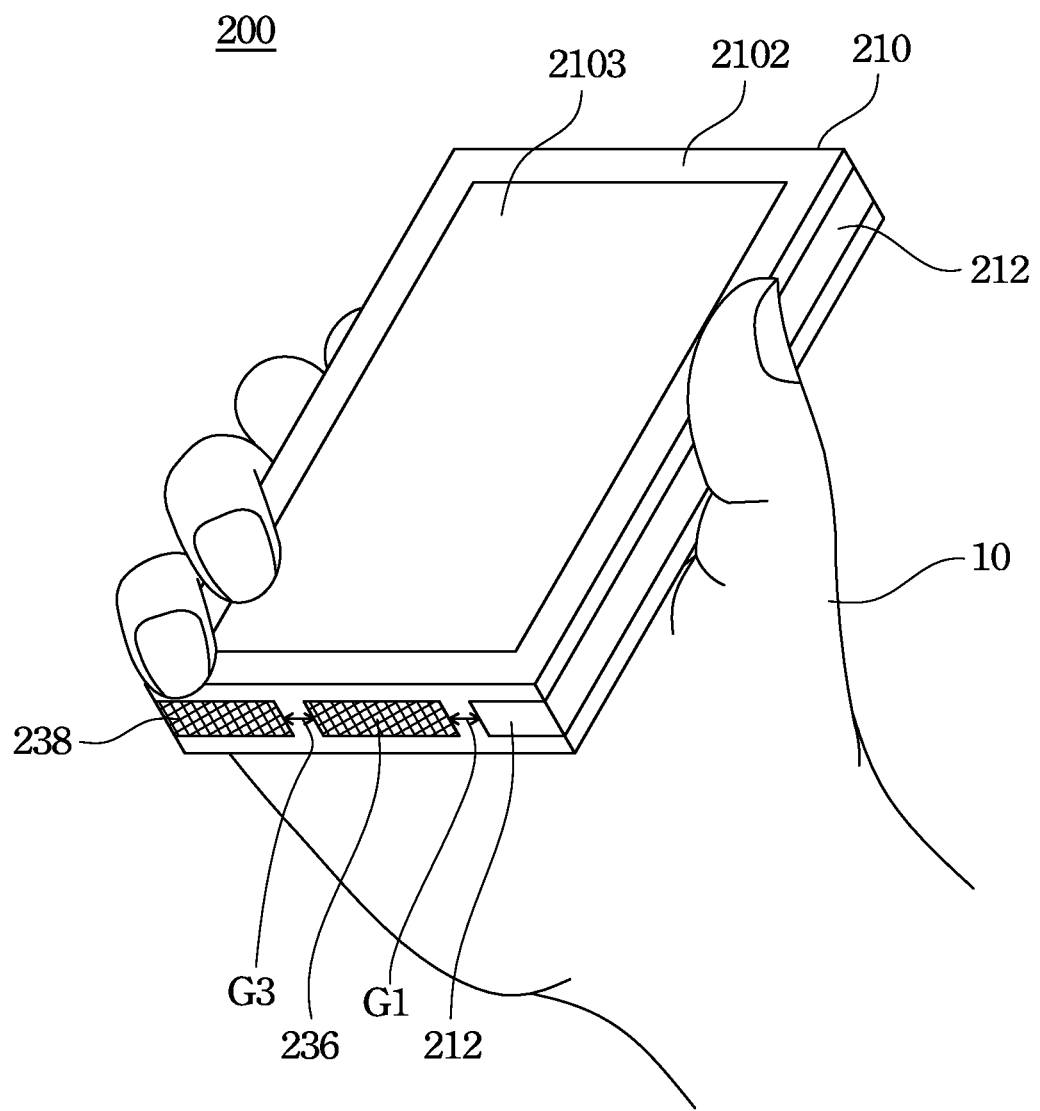
FIG. 2C shows the portable communication device of FIG. 2A in a condition held in a second use position.

FIG. 2C shows the portable communication device 200 of FIG. 2A in a condition held in a second use position. In an embodiment of the present invention, when the portable communication device 200 is held in the second use position, such as when making a call using the portable communication device 200 (a Voice mode), the user's hand 10 may be close to or touch to the second metal element 238 disposed on sides of the housing 210. When the user's hand 10 is close to or touches the second metal element 238, a plurality of resonant modes generated by the PIFA 250 and the second metal element 238 may be interfered with by a parasitic capacitance effect, thereby causing resonant frequency shifts and increasing return loss to, in turn, reduce the communication quality of the portable communication device 200.

Figure 3C:
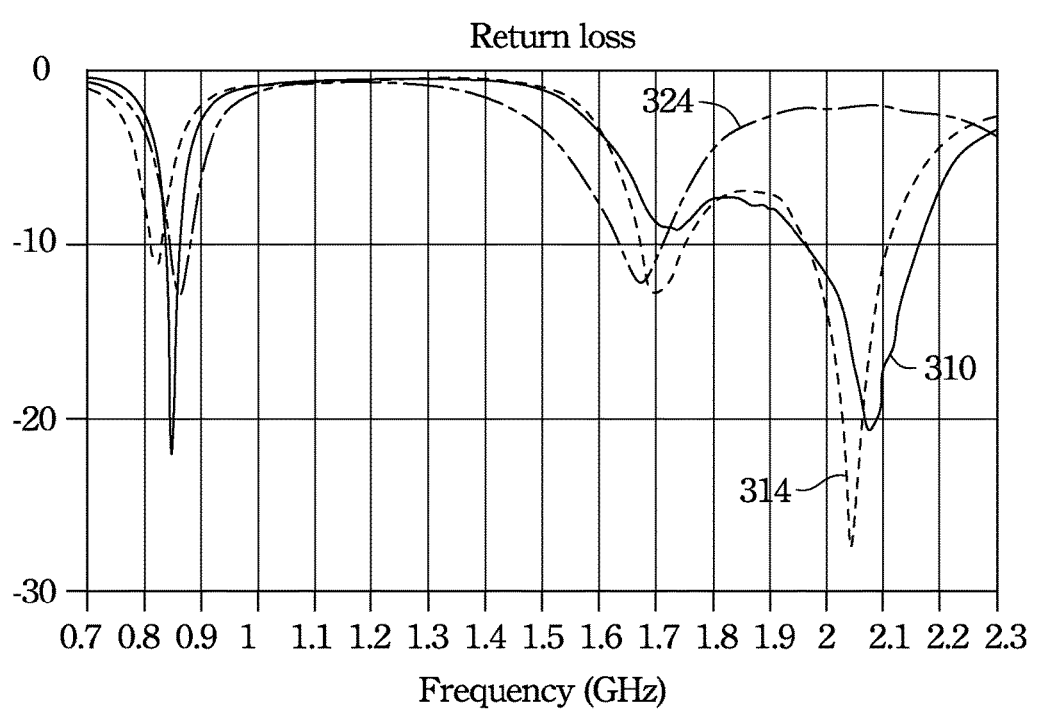
FIG. 3C is a graph illustrating antenna return loss of the portable communication device of FIG. 2A when held in the second use position as shown in FIG. 2C.

FIG. 3C is a graph illustrating antenna return loss of the portable communication device when held in the second use position as shown in FIG. 2C. In FIG. 3C, a return loss curve 314 is the return loss measurement result in the second operating mode of the PIFA 250 and the first metal element 236 of the portable communication device 200, and a return loss curve 324 is the return loss measurement result in the second operating mode of the PIFA 250 and the second metal element 238 of the portable communication device 200. When the user's hand 10 is close to or touches the second metal element 238, the portable communication device 200 can select the first metal element 236 by the switching unit 134 shown in FIG. 1 to form the resonant cavity, so that the resonant frequencies of the first to the third resonant mode generated by the PIFA 250 and the first metal element 236 are within the operating frequency bands of DCS-1800 and/or PCS-1900, UMTS-2100 and GSM-900, and the portable communication device 200 also has better return loss within the foregoing operating frequency bands, as shown by the return loss curve 314.

Moreover, in an embodiment of the present invention, the electrical length of the first radiating portion 156 in FIG. 1A is adjustable, so that the resonant frequency of the second resonant mode of the PIFA 150 can be adjusted within either 1710 MHz~1990 MHz or 1990 MHz~2170 MHz depending on the desired application. Similarly, the electrical lengths of the first metal element 136 and the second metal element 138 are also adjustable, so that the resonant frequency of the first resonant mode of the switchable resonant antenna 130 can be adjusted within the operating frequency band of GPS, i.e., 1575 MHz, or the operating frequency band of Bluetooth and/or WiFi, i.e., 2.4 GHz. In view of the above, the portable communication device 100 of this disclosure can operate in aforesaid communication frequency bands and thereby conform to the requirements of current wireless communication regulations.

In summary, through the foregoing embodiments of this disclosure, the sensing unit can detect if a user is close to or touching certain portions of the appearance and accordingly the switching unit can select a suitable resonant metal element, so that the interference caused by users to the resonant frequency and the return loss of antenna resonant mode can be reduced. Therefore, the communication quality of the portable communication device is guaranteed.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable communication device, comprising:
    a housing;
    a substrate disposed in the housing, the substrate having a ground plane; and
    an antenna comprising, a switching unit, a first metal element and a second metal element, the switching unit electrically couples the ground plane to the first metal element or the second metal element according to a detected result; and
    wherein the first metal element and the second metal element are portions of the housing, and an effective electronic length of the first metal element is equal to an effective electronic length of the second metal element.

2. The portable communication device of claim 1, wherein the antenna is a switchable resonant antenna and comprising a first connection portion, the first connection portion is electrically coupled between the ground plane and the switching unit, and the first connection portion is coupled to the first metal element or the second metal element via the switching unit according to a control signal generated corresponding to a detected result.

3. The portable communication device of claim 1, wherein a first resonant cavity is formed between the first metal element and the ground plane when the ground plane is electrically coupled to the first metal element, and a second resonant cavity is formed between the second metal element and the ground plane when the ground plane is electrically coupled to the second metal element.

4. The portable communication device of claim 3, wherein the housing comprises a bezel, wherein a first gap is formed between one end of the bezel and the first metal element, and a second gap is formed between another end of the bezel and the second metal element.

5. The portable communication device of claim 4, wherein the bezel is metal.

6. The portable communication device of claim 4, wherein the first gap and an electronic length of the first metal element are adjustable for controlling a first resonant mode generated by the first resonant cavity, and the second gap and an electronic length of the second metal element are adjustable for controlling the first resonant mode generated by the second resonant cavity.

7. The portable communication device of claim 4, further comprising:
a first sensing unit disposed adjacent to the first gap for sensing whether an object is close to or touches the first metal element and accordingly generating a first sensing signal; and
a second sensing unit disposed adjacent to the second gap for sensing whether the object is close to or touches the second metal element and accordingly generating a second sensing signal.

8. The portable communication device of claim 7, further comprising:
a control unit electrically coupled to the first sensing unit, the second sensing unit and the switching unit for generating the control signal based on the sensing signals to control a switching state of the switching unit.

9. The portable communication device of claim 1, further comprising:
a planar inverted-F antenna comprising a feeding portion, a ground end, a second connection portion, a first radiating portion and a second radiating portion, the feeding portion and the ground end being electrically coupled to the substrate, the ground end being electrically coupled to the ground plane of the substrate, and the second connection portion being electrically coupled to the feeding portion, the ground end, the first radiating portion and the second radiating portion.

10. The portable communication device of claim 9, wherein the first radiating portion is disposed on or inside the housing to generate a second resonant mode, and the second radiation portion is also disposed on or inside the housing to generate a third resonant mode.

11. The portable communication device of claim 1, further comprising at least one of a monopole antenna, a loop antenna, a slot antenna and an inverted-F antenna to generate resonant modes of required operating frequency bands.

12. The portable communication device of claim 4, wherein the bezel is non-metal.

13. A portable communication device, comprising:
a housing;
a substrate disposed in the housing, the substrate having a ground plane; and
an antenna comprising a switching unit, a first metal element and a second metal element, the switching unit is for electrically coupling the ground plane to the first metal element or the second metal element according to a detected result;
wherein the switching unit is operated between a first state and a second state, the switching unit electrically couples the ground plane to the first metal element under the first state, and the switching unit electrically couples the ground plane to the second metal element under the second state, and
wherein the first metal element and the second metal element are portions of the housing, and an effective electronic length of the first metal element is equal to an effective electronic length of the second metal element.

14. The portable communication device of claim 13, wherein the antenna is a switchable resonant antenna and comprising a first connection portion, the first connection portion is electrically coupled between the ground plane and the switching unit, and the switching unit is for electrically coupling the first connection portion to the first metal element or the second metal element according to a control signal generated corresponding to a detected result, so as to generate a first resonant mode.

15. The portable communication device of claim 13, wherein a first resonant cavity is formed between the first metal element and the ground plane when the ground plane is electrically coupled to the first metal element, and a second resonant cavity is formed between the second metal element and the ground plane when the ground plane is electrically coupled to the second metal element.

16. The portable communication device of claim 15, wherein the housing comprises a bezel, wherein a first gap is formed between one end of the bezel and the first metal element, and a second gap is formed between another end of the bezel and the second metal element.

17. The portable communication device of claim 15, wherein the first gap and an electronic length of the first metal element are adjustable for controlling the first resonant mode generated by the first resonant cavity, and the second gap and an electronic length of the second metal element are adjustable for controlling the first resonant mode generated by the second resonant cavity.

18. The portable communication device of claim 15, further comprising:
a first sensing unit disposed adjacent to the first gap for sensing whether an object is close to or touches the first metal element and accordingly generating a first sensing signal; and
a second sensing unit disposed adjacent to the second gap for sensing whether the object is close to or touches the second metal element and accordingly generating a second sensing signal.

19. The portable communication device of claim 18, further comprising:
a control unit electrically coupled to the first sensing unit, the second sensing unit and the switching unit for generating the control signal based on the sensing signals to control a switching state of the switching unit.

20. The portable communication device of claim 14, further comprising:

a planar inverted-F antenna comprising a feeding portion, a ground end, a second connection portion, a first radiating portion and a second radiating portion, the feeding portion and the ground end being electrically coupled to the substrate, the ground end being electrically coupled to the ground plane of the substrate, and the second connection portion being electrically coupled to the feeding portion, the ground end, the first radiating portion and the second radiating portion.

* * * * *